(12) United States Patent
Lee et al.

(10) Patent No.: US 8,116,814 B2
(45) Date of Patent: Feb. 14, 2012

(54) MOBILE COMMUNICATIONS TERMINAL USING MULTI-FUNCTIONAL SOCKET AND METHOD THEREOF

(75) Inventors: Yong-Hum Lee, Gyeonggi-Do (KR); Seong-Cheol Lee, Seoul (KR); Sung-Il Ha, Gyeonggi-Do (KR); Sang-Chul Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/961,456

(22) Filed: Dec. 6, 2010

(65) Prior Publication Data

US 2011/0078345 A1   Mar. 31, 2011

Related U.S. Application Data

(62) Division of application No. 11/414,640, filed on Apr. 27, 2006, now Pat. No. 7,899,494.

(30) Foreign Application Priority Data

Apr. 27, 2005 (KR) .................... 2005-35189
Dec. 2, 2005 (KR) .................... 2005-117103
Dec. 6, 2005 (KR) .................... 2005-118405
Apr. 26, 2006 (KR) .................... 2006-37546

(51) Int. Cl.
*H04M 1/00* (2006.01)
*H04B 1/38* (2006.01)

(52) U.S. Cl. ............ 455/557; 455/556.1; 455/418; 455/420; 455/558; 455/559; 455/90.3; 710/8; 710/10; 710/300; 710/303; 710/306; 710/316

(58) Field of Classification Search .......... 455/418–420, 455/556.1, 557–559, 560, 90.3; 710/8–10, 710/300, 303, 305, 306, 316
See application file for complete search history.

(56) References Cited

U.S. PATENT DOCUMENTS

| | | | | |
|---|---|---|---|---|
| 5,991,640 | A * | 11/1999 | Lilja et al. .................... | 455/557 |
| 6,418,486 | B1 * | 7/2002 | Lortz et al. ................... | 710/10 |
| 6,718,182 | B1 * | 4/2004 | Kung ........................ | 455/556.1 |
| 6,725,061 | B1 * | 4/2004 | Hutchison et al. ............ | 455/557 |
| 6,836,814 | B2 * | 12/2004 | Takaoka et al. ............... | 710/316 |
| 7,627,704 | B2 * | 12/2009 | Croyle et al. ................ | 710/105 |

FOREIGN PATENT DOCUMENTS

| | | |
|---|---|---|
| EP | 1150525 | 10/2001 |
| EP | 1315361 | 5/2003 |
| KR | 20-2001-0001824 | 1/2001 |
| KR | 1020050006484 | 1/2005 |
| KR | 1020050027479 | 3/2005 |

* cited by examiner

*Primary Examiner* — Tuan A Tran
(74) *Attorney, Agent, or Firm* — Lee, Hong, Degerman, Kang & Waimey

(57) ABSTRACT

A mobile communications terminal using a multi-functional socket and a method thereof, the mobile communications device comprising a connector capable of connecting the mobile communications device to at least one external device for establishing an electrical connection between the at least one external device and the mobile communications device; a switching unit; and a controller cooperating with the connector and the switching unit to perform, sending and/or receiving at least one signal with respect to the at least one external device via at least one dedicated path according to at least one identification signal; and generating a control signal to control the at least one signal, wherein the at least one signal comprises at least one of a power signal and data.

15 Claims, 22 Drawing Sheets

FIG. 4A

| Pin Number | Signal Name |
|---|---|
| 1 | - |
| 2 | - |
| 3 | - |
| 4 | EAR_R+ |
| 5 | EAR_L+ |
| 6 | - |
| 7 | HOOK DETECT |
| 8 | EAR_M- |
| 9 | - |
| 10 | - |
| 11 | SELECT_1 |
| 12 | GND |

FIG. 4B

| Pin Number | Signal Name |
|---|---|
| 1 | VPWR |
| 2 | - |
| 3 | USB_POWER |
| 4 | USB_D+ |
| 5 | USB_D- |
| 6 | PCM_TX / TXD |
| 7 | PCM_SYNC / CTS |
| 8 | PCM_CLK / RTS |
| 9 | PCM_RX / RXD |
| 10 | SELECT_2 |
| 11 | - |
| 12 | GND |

FIG. 4C

| Pin Number | Signal Name |
|---|---|
| 1 | - |
| 2 | BATTERY LINE |
| 3 | POWER ON |
| 4 | TXD |
| 5 | RXD |
| 6 | TDO_ARM |
| 7 | TMS |
| 8 | TCK |
| 9 | TDI |
| 10 | SELECT_3 |
| 11 | - |
| 12 | GND |

FIG. 7A

| Pin Number | Signal Name |
|---|---|
| LATCH | ~ |
| 1 | GND |
| 2 | EAR_SENSE |
| 3 | EAR_M- |
| 4 | EAR_L+ |
| 5 | EAR_R+ |
| 6 | REM_VCC |
| 7 | ~ |
| 8 | ~ |
| 9 | REM_INT |
| 10 | REM_ADC |
| 11 | ~ |
| 12 | ~ |

| Pin Number | Signal Name |
|---|---|
| LATCH | BATTERY ID |
| 1 | GND |
| 2 | -- |
| 3 | -- |
| 4 | -- |
| 5 | -- |
| 6 | -- |
| 7 | -- |
| 8 | -- |
| 9 | -- |
| 10 | -- |
| 11 | VPWR |
| 12 | VPWR |

| Pin Number | Signal Name |
|---|---|
| LATCH | - |
| 1 | GND |
| 2 | - |
| 3 | - |
| 4 | - |
| 5 | - |
| 6 | - |
| 7 | - |
| 8 | ON_SWITCH |
| 9 | - |
| 10 | - |
| 11 | VPWR |
| 12 | VPWR |

| Pin Number | Signal Name |
|---|---|
| LATCH | - |
| 1 | GND |
| 2 | - |
| 3 | - |
| 4 | - |
| 5 | - |
| 6 | - |
| 7 | USB_POWER |
| 8 | - |
| 9 | USB_D+ |
| 10 | USB_D- |
| 11 | - |
| 12 | - |

FIG. 7E

| Pin Number | Signal Name |
|---|---|
| LATCH | - |
| 1 | GND |
| 2 | - |
| 3 | - |
| 4 | - |
| 5 | - |
| 6 | - |
| 7 | - |
| 8 | - |
| 9 | TXD |
| 10 | RXD |
| 11 | - |
| 12 | - |

FIG. 10A

| Pin Number | Signal Name | Signal Name |
|---|---|---|
| LATCH | - | BATTERY ID |
| 1 | GND | GND |
| 2 | EAR_SENSE | - |
| 3 | EAR_M- | - |
| 4 | EAR_L+ | - |
| 5 | EAR_R+ | - |
| 6 | REM_VCC | - |
| 7 | - | - |
| 8 | - | - |
| 9 | REM_INT | - |
| 10 | REM_ADC | - |
| 11 | - | VPWR |
| 12 | - | VPWR |

FIG. 10C

| Pin Number | Signal Name | Signal Name |
|---|---|---|
| LATCH | - | - |
| 1 | GND | GND |
| 2 | EAR_SENSE | - |
| 3 | EAR_M- | - |
| 4 | EAR_L+ | - |
| 5 | EAR_R+ | - |
| 6 | REM_VCC | - |
| 7 | - | USB_POWER |
| 8 | - | - |
| 9 | REM_INT | USB_D+ / TXD |
| 10 | REM_ADC | USB_D- / RXD |
| 11 | - | - |
| 12 | - | - |

FIG. 10E

| Pin Number | Signal Name | Signal Name |
|---|---|---|
| LATCH | BATTERY ID | - |
| 1 | GND | GND |
| 2 | - | - |
| 3 | - | - |
| 4 | - | - |
| 5 | - | - |
| 6 | - | - |
| 7 | - | USB_POWER |
| 8 | - | - |
| 9 | - | USB_D+ / TXD |
| 10 | - | USB_D- / RXD |
| 11 | VPWR | - |
| 12 | VPWR | - |

MOBILE COMMUNICATIONS TERMINAL USING MULTI-FUNCTIONAL SOCKET AND METHOD THEREOF

CROSS-REFERENCE TO RELATED APPLICATIONS

This application is a divisional of U.S. application Ser. No. 11/414,640, filed Apr. 27, 2006, issued as U.S. Pat. No. 7,899,494, which claims the benefit of earlier filing date and right of priority to Korean Application No. 35189/2005, filed on Apr. 27, 2005, Korean Application No. 117103/2005, filed on Dec. 2, 2005, Korean Application No. 118405/2005, filed on Dec. 6, 2005, and Korean Application No. 37546/2006, filed on Apr. 26, 2006, the contents of all of which are hereby incorporated by reference herein in their entirety.

BACKGROUND OF THE INVENTION

1. Field of the Invention

The present invention relates to a mobile communications terminal, and particularly, to a mobile communications terminal using a multi-functional socket or a female connector which is capable of minimizing a size of a mobile communications terminal, and a method thereof.

2. Background of the Invention

In general, a mobile communications terminal is a communication device capable of providing a wireless call to another party and providing a wireless connection anytime and anywhere by a switching control of an MSC (Mobile Switching Center) while moving in a service region formed by a BS (Base Station).

The mobile communications terminal is provided in an outer surface thereof with a receptacle for a data communication interface with external devices such as a computer or a digital camera and a socket for an interface with peripheral devices such as an earphone or a speaker.

The data communication between the mobile communications terminal and the external device is performed by a data communication between an internal or external memory of the external device and a Universal Serial Bus (USB) or a Universal Asynchronous Receiver/Transmitter (UART) of the mobile communications terminal. Here, the UART refers to a microchip storing programs for controlling interfaces toward serial devices attached to the mobile communications terminal, while the USB refers to an interface for enabling a data communication between the mobile communications terminal and the peripheral devices such as mouse, printer, modem, speaker, and the like.

For the data communications, a USB or UART cable is connected between the mobile communications terminal and the external device. One side of the USB or UART cable is connected to a USB or UART port of the external device, and the other side thereof is connected to the receptacle of the mobile communications terminal.

In addition, for using an earphone or a microphone by connecting to the mobile communications terminal, the earphone or the microphone is inserted into the socket of the mobile communications terminal to thus input an audio signal to the mobile communications terminal or to output the audio signal therefrom.

A remote controller of the mobile communications terminal is connected into the middle of the cable of the earphone or microphone connected to the mobile communications terminal to thus control a communication key of the mobile communications terminal, a function key of an MP3 player, and the like, resulting in enabling a user to remotely control the operation of his mobile communications terminal.

The related art mobile communications terminal was provided with a receptacle for a data signal and a socket for a audio signal in its outer surface, and, performed a data communication or inputted/outputted the audio signal by inserting a connector for the data signal or a connector for the audio signal thereinto, if necessary. Namely, the related art mobile terminal respectively assigns function corresponding to different interfaces or connectors to the receptacle and the socket unit.

However, the related art mobile communications terminal is provided with the receptacle for the data signal and the socket for the audio signal. As a result, components included in the receptacle or socket occupy a considerable area at the outer surface of the mobile communications terminal, and also are positioned in a considerably large area in the mobile communications terminal, which results in a difficulty in minimizing of the size of the mobile communications terminal.

SUMMARY OF THE INVENTION

One aspect of the present invention pertains to the recognition by the present inventors about the background art problems explained above. Namely, it would be advantageous to provide a mobile communications terminal using a multi-functional socket or a connector which is capable of minimizing a size of a mobile communications terminal meanwhile performing all of a data input/output function and a charging function by use of one socket unit which is provided in the mobile communications terminal for receiving at least one signal of a power signal and a data from an external device connected thereto, and a method thereof.

To achieve these and other advantages and in accordance with the purpose of the present invention, as embodied and broadly described herein, there, is provided a mobile communications device comprising a connector, capable of connecting the mobile communications device to at least one external device for establishing an electrical connection between, the at least one external device and the mobile communications device; a switching unit; and a controller cooperating with the connector and the switching unit to perform, sending and/or receiving at least one signal with respect to the at least one external device via at least one dedicated path according to at least one identification signal; and generating a is control signal to control the at least one signal, wherein the at least one signal comprises at least one of a power signal and data.

To achieve these and other advantages and in accordance with the purpose of the present invention, there is provided a method for using a multi-functional connector of a mobile terminal comprising connecting at least one external equipment to the mobile terminal and establishing an electrical connection between the terminal and the equipment; determining whether to receive and send data between the at least one external equipment and the mobile terminal, or receive at the mobile terminal a power signal from an external equipment; processing the power signal if the mobile terminal is determined to receive the power signal; and directing the data to at least one designated path corresponding to at least one identification signal and generating at least one control signal to control directed data based upon the determining to receive and send the data.

To achieve these and other advantages and in accordance with the purpose of the present invention, there is provided an adapter for a mobile communications terminal, comprising a main housing; a first aligning portion extending beyond a first surface of the main housing in a first direction; a plurality of first electrical contacts supported by the first aligning portion; and a plurality of second electrical contacts disposed along a second aligning portion spaced apart from the first aligning portion, the second aligning portion extending beneath a second surface of the main housing in a second direction.

To achieve these and other advantages and in accordance with the purpose of the present invention, there is provided a system comprising at least one external equipment comprising a connector portion; and a mobile communications terminal comprising, a connector capable of connecting the mobile communications terminal to the at least one external equipment; a switching unit; and a controller cooperating with the connector and the switching unit to perform, sending and/or receiving at least one signal with respect to the at least one external equipment via at least one dedicated path according to at least one identification signal; and generating a control signal to control the at least one signal, wherein the at least one signal comprises at least one of a power signal and data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A through 4C are views illustrating pin allocation tables of connector of several external device in accordance with a first embodiment of the present invention;

FIGS. 7A through 7E are views illustrating pin allocation tables for a multi-functional socket in accordance with a second embodiment of the present invention;

FIGS. 10A through 10F are views illustrating pin allocation tables for a multi-functional socket in accordance with a third embodiment of the present invention.

DETAILED DESCRIPTION OF THE INVENTION

Description will now be given in detail of the present invention, with reference to the accompanying drawings.

Explanations will now be made for a mobile communications terminal using a multi-functional socket which is capable of minimizing a size of a mobile communications terminal by performing all of a data input/output function and a charging function by use of one socket unit which is provided in the mobile communications terminal for receiving at least one of a power signal and a data from an external device connected thereto, and a method thereof. Furthermore, the present invention may provide an adapter for a mobile communications terminal which is an object that you use to connect two different pieces of electrical equipment, or to connect two pieces of equipment to the same power supply and is capable of simultaneously performing at least two functions of a data input/output function and a charging function.

One socket unit for performing the data input/output function and the charging function to be explained with reference to embodiments of the present invention may be applied to all types of mobile communications terminals including mobile phones, Personal Digital Assistants (PDAs), note books, a Portable Multimedia Players (PMPs), and the like. Here, the data comprises at least one of a call connection signal, a call receiving signal, a general device controlling signal, a computer file, a text data, a Universal Serial Bus (USB) data, and Universal Asynchronous Receiver/Transmitter (UART) data and a multimedia data. In addition, a TV-out function may be performed by the one socket unit disposed in the mobile communications terminal.

Here, the one socket unit provided in the mobile communications terminal refers to a socket unit to which an earphone for performing an data input/output function is connected. The socket unit is constituted with 12 pins in the embodiments of the present invention. However, the construction of the socket unit may not be limited on 12 pins. Rather, it may be preferable to include the minimum number of pins required for performing all of the data input/output function and the charging function.

Figure 1:
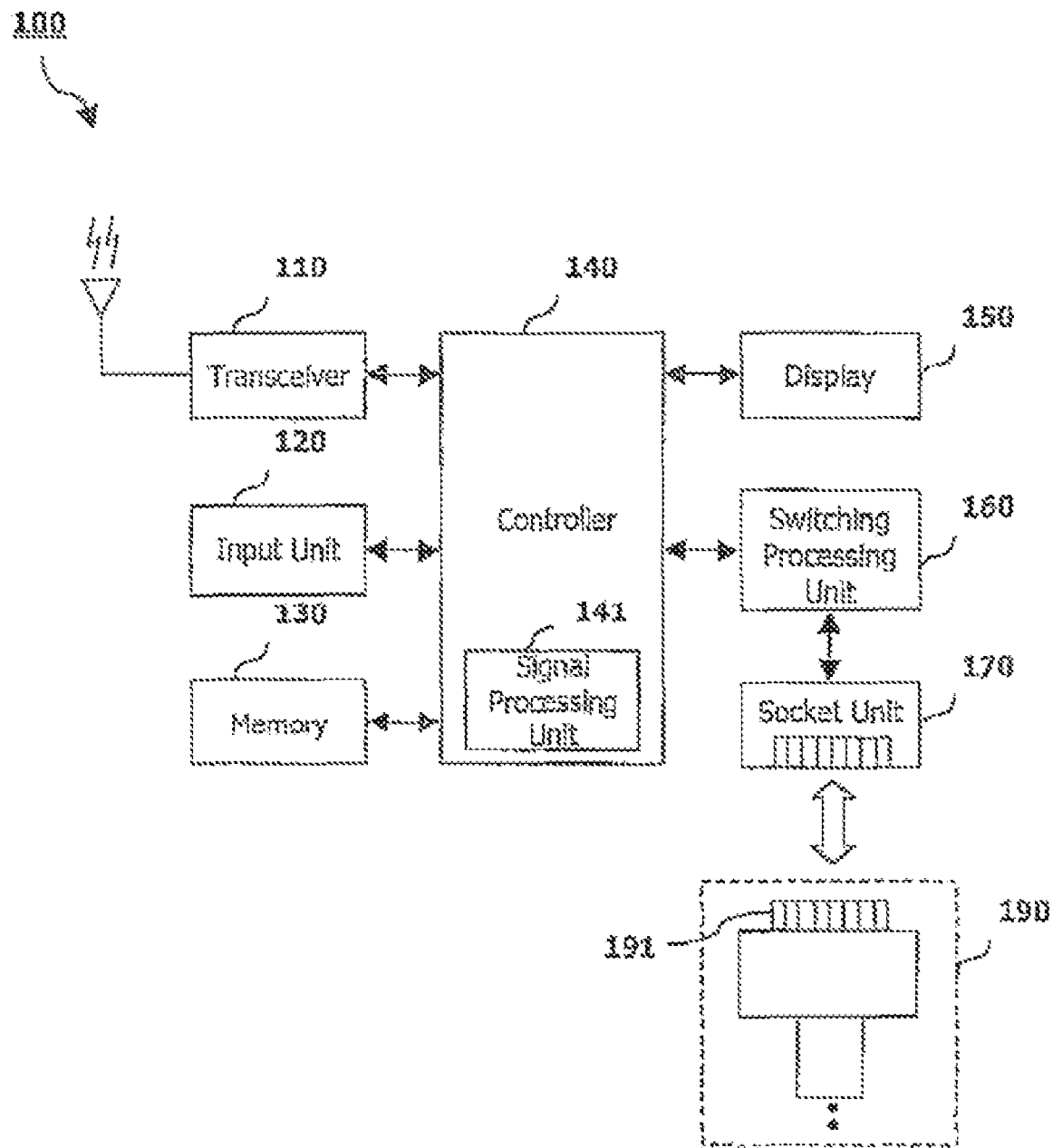
FIG. 1 is a view illustrating an exemplary view of a mobile communications terminal using a multi-functional socket in accordance with a first embodiment of the present invention.

FIG. 1 is a view illustrating a construction of a mobile communications terminal using a multi-functional socket in accordance with a first embodiment of the present invention.

As illustrated in FIG. 1, a mobile communications terminal using a multi-functional socket in accordance with a first embodiment of the present invention may include a transceiver 110, a input unit 120, a display 150, a socket unit, a connector, or a jack 170 for receiving and/or sending at least one of a power signal and a data from an external device connected thereto, a switching unit (or switching circuit) 160 for forwarding the received data to designated paths according to at least one identification signal, a controller 140 for generating at least one control signal to control the forwarded data, and a memory 130 for storing information for the socket unit 170 and a connector of the external device connected to the socket unit 170.

Here, the switching unit 160 forwards signals inputted from the external device performing at least one of the data input/output function and the charging function to designated paths based upon at, least one identification signal inputted from the connected external device. The identification signal denotes a signal outputted from an arbitrary pin of the socket unit 170 to which a connector of the external device is connected to thus identify a type of at least one external device.

Figure 2:
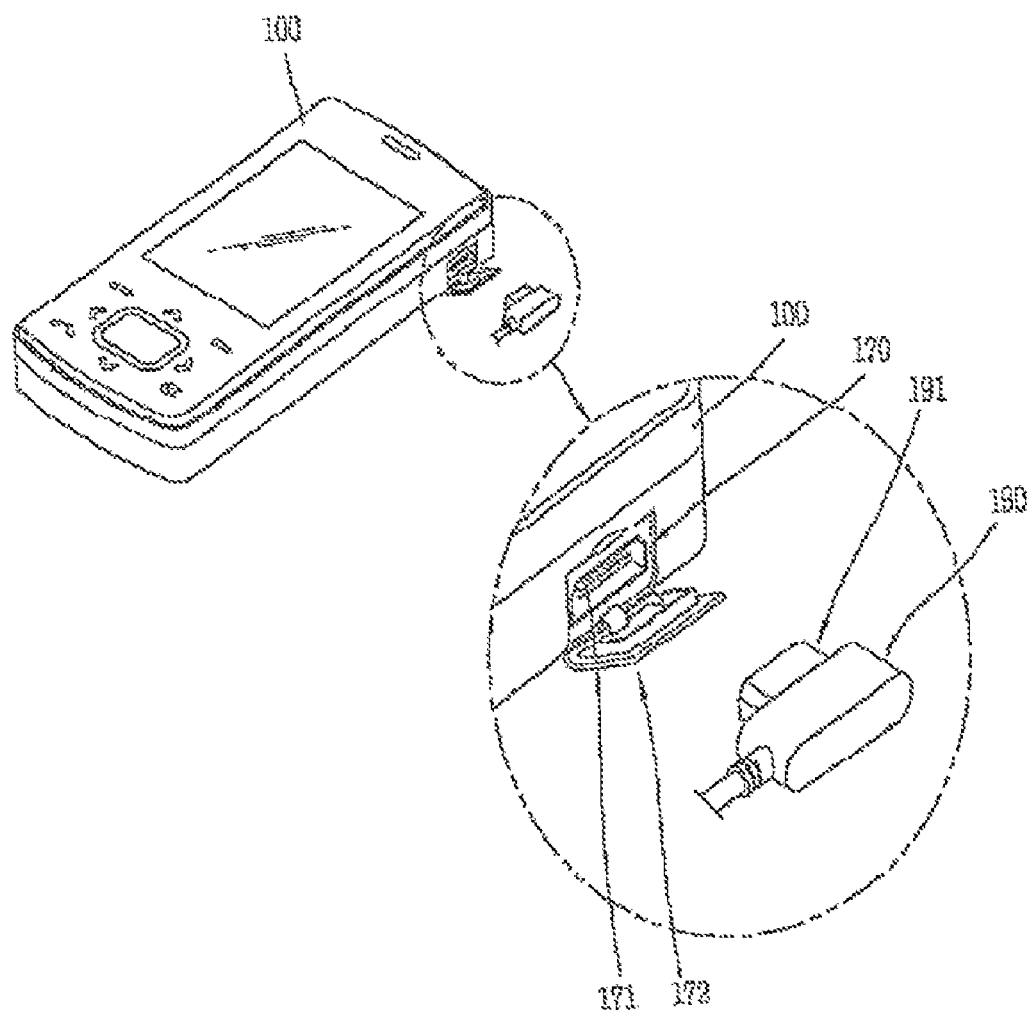
FIG. 2 illustrates an exemplary embodiment of a connector of the mobile communications terminal in accordance with the first embodiment of the present invention.

FIG. 2 shows the exemplary view of the connector or socket unit 170 arranged at the mobile communications terminal in accordance with the first embodiment of the present invention.

As illustrated in FIG. 2, the socket unit or connector 170 may be provided in an arbitrary area of the mobile communications terminal 100 so as to be connected to a connector portion 190 of at least one of several external equipment (not shown) performing the data input/output function and the charging function. Preferably, the socket unit 170 may be provided at a left or right side of upper, lower, left and right sides based upon a display unit of the mobile communications terminal.

Opposite the connector 170, a connector portion 190 of the external equipment can include an aligning portion 191 to guide the connector 170 to receive the connector portion 190 of the external equipment. The aligning portion 191 may extend beyond one surface of the connector portion in a longitudinal direction and be configured to be shaped to match an opening of the connector 170. Here, the connector or socket unit 170 and the aligning portion 191 can be formed in various shapes, such as rectangle or circle. In addition, numerous materials can be used to make the connector 170 and aligning portion 191. The configuration of the connector 170 and the connector portion 190 as explained above can merely be cited for the sake of explanation of the present invention and the shape other than this can be used as it would be understood by those skilled in the art.

A plurality of electrical contacts or pins 171 can be disposed at an inner or outer surface of the connector 170 on a serial configuration, a parallel configuration or a variety of different configurations including a single row arrangement or two. Furthermore, a plurality of second electrical contacts can be arranged at an inner or outer surface of the aligning portion 191 of the connector portion 190 to be mated with the plurality of electrical contacts 171. The configuration of the plurality of electrical contacts 171 arranged inside the connector 170 has been referred to merely for the sake of explanation of the present invention and other configurations. For example, two or more smaller connectors instead of a single connector as shown in FIG. 2 can be arranged at the mobile terminal and at least one set of smaller number of electrical contacts can be disposed in each of the two or more smaller connectors. Additionally, the smaller sized connector can be configured to be a form of an audio jack and the corresponding one set of the plurality of electrical contacts can be arranged along the audio jack shaped connector in a longitudinal direction. This audio shaped jack can receive an ordinary audio plug of a stereo head phone or speaker. Any different configuration of the connector, the plurality of electrical contacts and the connector portion other than the above recited embodiments can be used as it would be understood by those skilled in the art.

The opening of the connector 170 can be flush with the general outer surface of the mobile terminal body 100. The connector 170 may extend beneath the outer surface of the mobile terminal body to be mated with the aligning portion 191 as shown in FIG. 2. However, the arrangement of the connector 170 to receive the aligning portion 191 can be reversed in such a way that the connector portion 190 of the external equipment can receive a possible aligning portion of the connector 170, the configuration not shown.

Furthermore, the connector portion 190 can be formed in numerous configurations as shown in FIGS. 1 and 2. For example, the aligning portion 191 can be extended from a side wall of the connector portion 190 as shown in FIG. 2 or extended from a top surface of the connector portion 190 as shown in FIG. 1. Here, the terms, top and side, can be merely cited to describe a generation orientation of the FIG. 1 or 2 where the aligning portion 191 is disposed on the upper side of the connector portion 190 and a cable connected to the external equipment is disposed at the lower surface of the connector portion 190, as shown in FIG. 1.

The mobile terminal can further include a number of different types of a cover or protective device 172 to protect the plurality of contacts 171 disposed at an inner or outer surface of the connector 170. The connector 170 can be configured to be formed and mounted inside the mobile terminal in such way that the connector can be easily replaceable for any possible repair purpose.

A method for using the multi-functional socket of the mobile communications terminal in accordance with the first embodiment of the present invention having the construction will now be explained with reference to FIG. 3.

Figure 3:
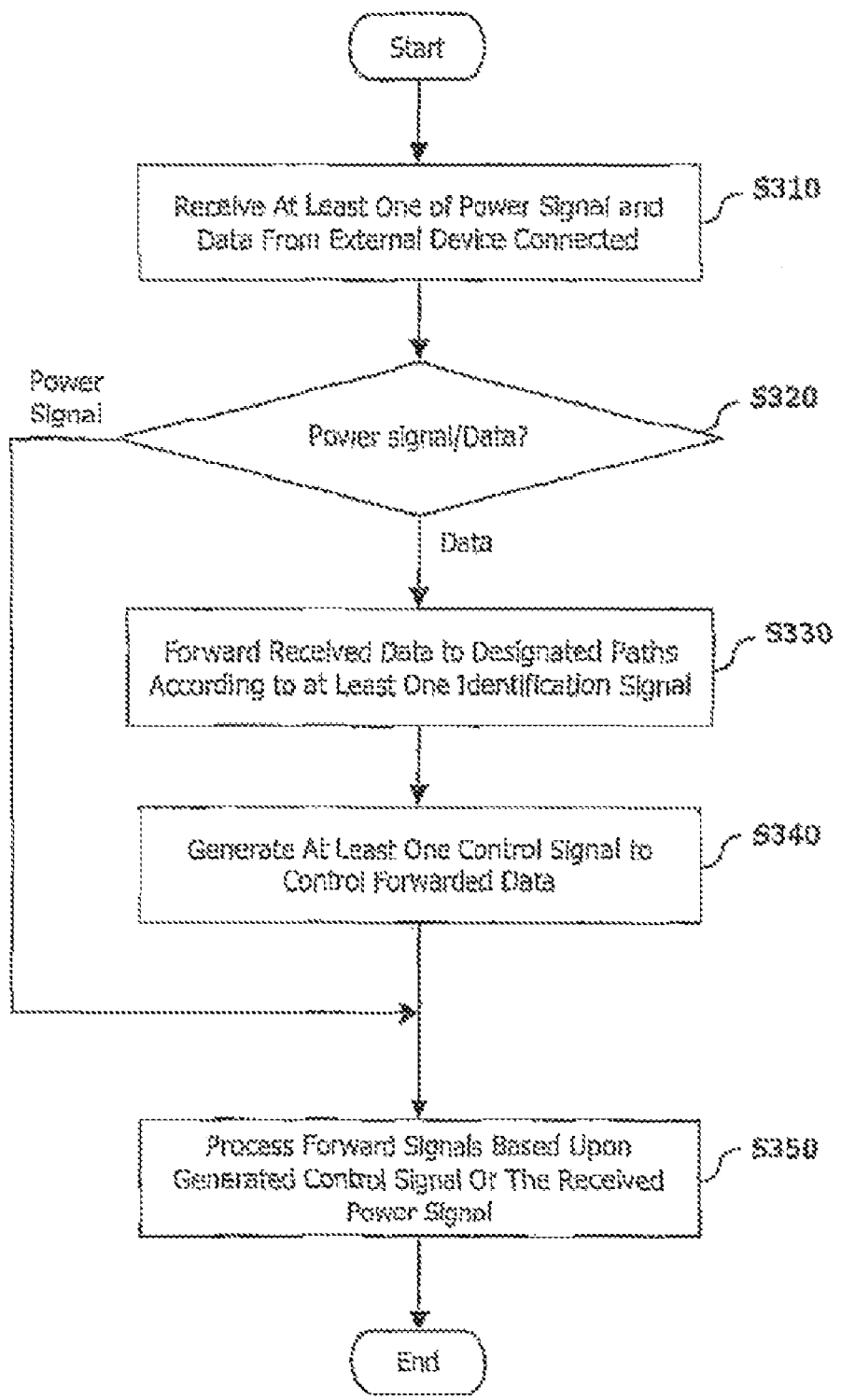
FIG. 3 is a flow chart illustrating sequential steps of a method for using a multi-functional socket in accordance with a first embodiment of the present invention.

FIG. 3 is a flow chart illustrating sequential steps of a method for using a multi-functional socket of a mobile communications terminal in accordance with a first embodiment of the present invention.

As illustrated in FIG. 3, a method for using a multi-functional socket of a mobile communications terminal in accordance with a first embodiment of the present invention may include receiving at least one of a power signal and a data from an external device connected (S310), determining whether the signal is data or the power signal (S320); if the signal is data, forwarding the received data to a designated path according to at least one identification signal (S330), generating at least one control signal to control the forwarded data (S340), and processing the forwarded data based upon the generated control signal (S350). If the signal is the power signal, then the method step can move to the step for processing the power signal (S350).

The method for using the multi-functional socket of the mobile communications terminal in accordance with the first embodiment of the present invention having the construction will now be explained in detail.

First, the mobile communications terminal 100 is provided with the socket unit 170 which has the same number of pins as that of the connector portion 190 of the external device. The external device refers to equipment for performing a data input/output function such as an earphone, a Universal Serial Bus (USB) and Universal Asynchronous Receiver/Transmitter (UART) data communications, and equipment for performing a charging function.

Here, the socket unit 170 provided in the mobile communications terminal 100 is connected to the connector portion 190 of at least one external device which performs at least one function of the data input/output function and the charging function (S310). Pin mapping allocation tables which are differently constructed according to different types of external device will be described with reference to FIGS. 4A through 4C.

FIGS. 4A through 4C are views illustrating pin allocation tables of connector of several external device in accordance with a first embodiment of the present invention.

FIG. 4A illustrates a pin allocation table of the socket unit 170 for a connector portion 190 of the external equipment, especially, a user equipment, for performing the data input/output function among several external device in accordance with the first embodiment of the present invention. Here, in the connector portion 190 of the external device, the EAR_L+ (5) and EAR_R+(4) may be allocated for audio signals outputted from left and right sides of an earphone, respectively, HOOK DETECT(7) may be allocated for a signal which indicates whether an earphone switch has been pressed, EAR_M−(8) may be allocated for an audio signal inputted through a microphone of the earphone, and SELECT_1(11) may be allocated for a signal which indicates whether the earphone has been inserted into the socket unit 170.

FIG. 4B illustrates a pin allocation table of the socket unit 170 for a connector portion 190 of external equipment, especially, a user equipment, for performing the data input/output function among the several external device in accordance with the first embodiment of the present invention. Here, in the connector portion 190 of the external device, VPWR(1) may be allocated for a current for charging a battery, USB_POWER(3) may be allocated for power supplied via a USB, USB_D+(4) and USB_D−(5) may be respectively allocated for sending and receiving of USB data, TXD(6) and RXD(9) may be respectively allocated for sending and receiving UART data, CTS (Clear To Send)(7) may be allocated for a CTS signal, RTS (Ready To Send)(8) may be allocated for an RTS signal, and SELECT_2(10) may be allocated for a signal which indicates whether the user equipment has been connected.

FIG. 4C illustrates a pin allocation table of the socket unit 170 for a connector portion 190 of external equipment, especially, a developer equipment, for performing the data input/output function among the several external device in accordance with the first embodiment of the present invention. Here, in the connector portion 190 of the external device, BATTERY LINE(2) may be allocated for a power supply to a battery, POWER ON(3) may be allocated for turning power on of the mobile communications terminal 100, TXD(4) and RXD(5) may be respectively allocated for sending and receiving UART data, TDO_ARM(6), TMS(7), TCK(8) and TDI(9) may be allocated for a Joint Test Action Group (JTAG) mode for verification, and SELECT_3(10) may be allocated for a signal indicating whether the developer equipment has been connected.

The SELECT_2(11) of the user equipment and the SELECT_3(10) of the developer equipment are allocated to the same pin so as to be identified by signal value '0' or '1'. In addition, the pin mapping allocation tables for the socket unit 170 and the connector portion 190 of the external device connected to the socket unit 170 provided in the first embodiment of the present invention may be variously changeable according to methods to be used.

Thus, the mobile communications terminal according to the first embodiment of the present invention provides the pin mapping allocation table for equipments performing the data input/output function, namely, the user equipments and the developer equipment, which perform the data input/output function. Data inputted from the external device may be switched by identification signals inputted from an arbitrary pin, namely, a tenth pin or an eleventh pin of the connector portion 190 of the external device.

Afterwards, it can be determined whether the data has been received (S320) and when the data is received, the switching unit 160 can redirect the data inputted from the external device to designated paths according to the at least one identification signal (S330). A principle for forwarding the outputted data will be explained with reference to FIGS. 5A and 5B.

Figure 5A:
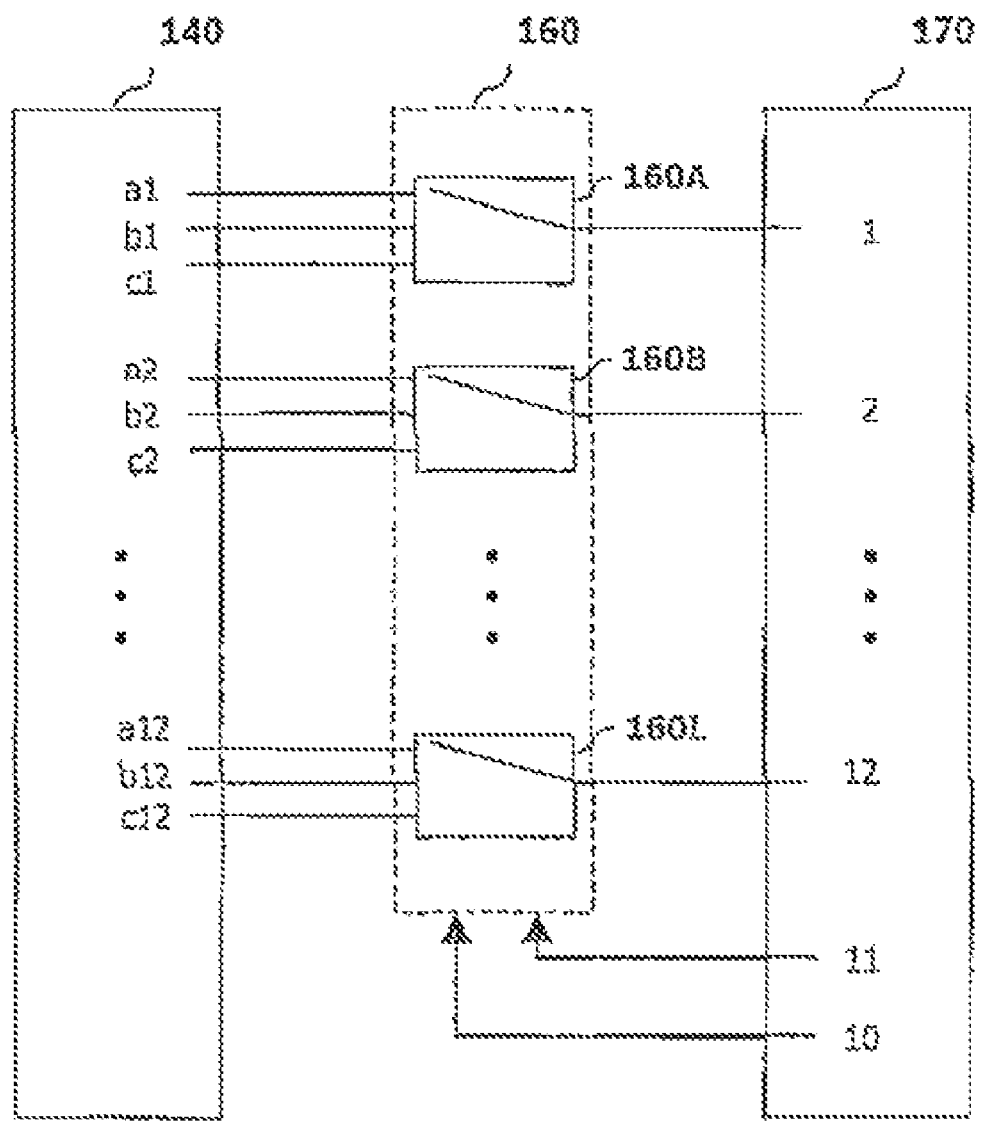
FIGS. 5A and 5B are exemplary views showing a mobile communications terminal using a switching processing unit in accordance with a first embodiment of the present invention.
Figure 5B:
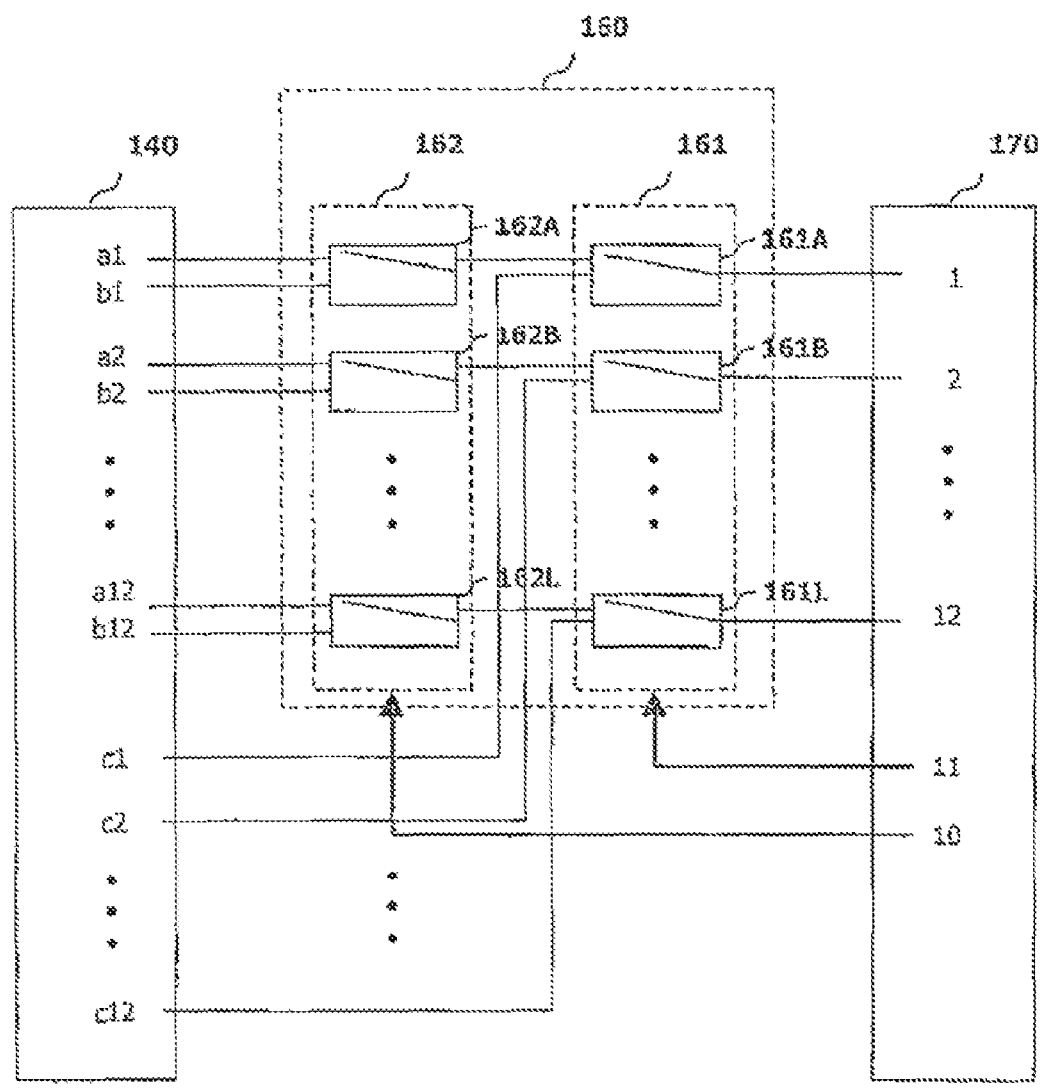

FIGS. 5A and 5B are views detailed structures of a switching unit in accordance with a first embodiment of the present invention.

As illustrated in FIG. 5A, the switching unit 160 in accordance with the first embodiment of the present invention forwards data inputted from 12 pins of the socket unit 170 to paths corresponding to the equipment for performing the data input/output function, respectively, according to at least one identification signal.

As illustrated in FIG. 5B, regarding the switching unit 160 in accordance with the first embodiment of the present invention, a first switch 161 forwards the data inputted from the 12 pins of the socket unit 170 to the paths corresponding to the equipments for performing the data input/output function according to a first identification signal, and then a second switch 162 forwards the data forwarded by the first switch 161 to paths respectively corresponding to the equipment for performing the data input/output function according to a second identification signal.

The switching unit (160) may forward the data inputted from at least one external device performing the data input/output function to the designated path via the first and second switches and the mobile terminal can include more switches according to different kinds of the data inputted from at least one external device.

Hence, the controller 140 generates at least one control signal to control the forwarded data (S340), and a signal processing unit 141 processes the forwarded data based upon the generated control signal or the received power signal (S350). The signal processing unit 141 denotes a plurality of functional blocks for processing sending and receiving of signals with external device which are connectable to the socket unit 170. The signal processing unit 141 may comprise an audio processing portion, a USB data processing portion, a UART data processing portion, a battery processing portion and the like, as hardware or software, according to types of external device connected to the socket unit 170.

Thus, the socket unit 170 of the mobile communications terminal is connected to at least one external device for performing at least one function to thus perform the corresponding function. Here, the number of pins of the connector portion 190 of the connected at least one external device may be constructed as same as the number of pins of the socket unit 170.

Conversely, when the number of pins of the connector portion 190 of the external device for performing at least one function of the data input/output function and the charging function is not constructed as same as the number of pins of the socket unit 170, an adapter for connecting the connector portion 190 of the external device and the socket unit 170 is used. Therefore, a construction of a mobile communications terminal having a multi-functional socket in accordance with a second embodiment of the present invention will now be explained with reference to FIG. 6.

Figure 6:
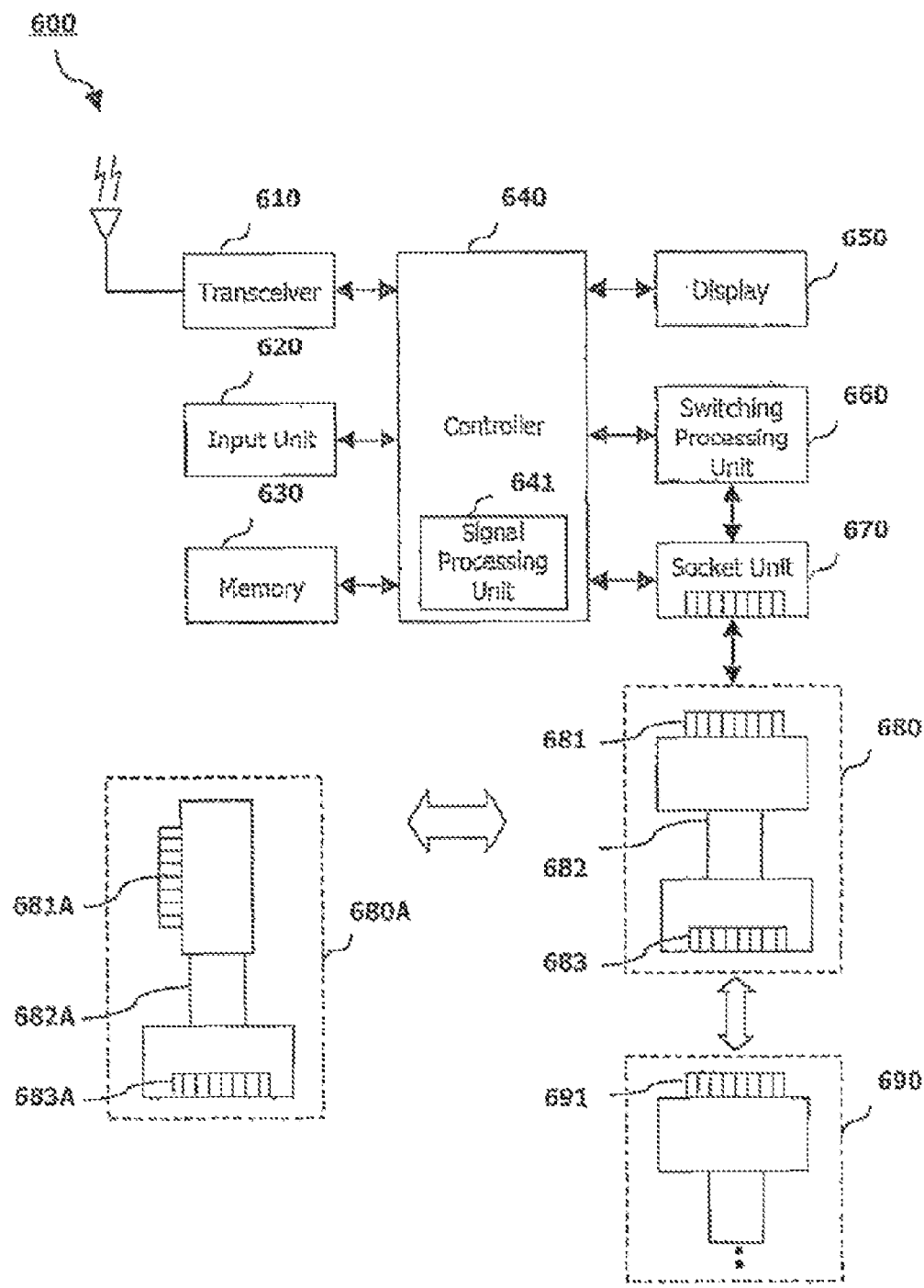
FIG. 6 is a view illustrating a construction of a multi-functional socket in accordance with a second embodiment of the present invention.

FIG. 6 is a view illustrating a construction of a multi-functional socket in accordance with a second embodiment of the present invention.

As illustrated in FIG. 6, a mobile communications terminal 600 using a multi-functional socket in accordance with a second embodiment of the present invention may include an adapter 680 connected, to a connector 690 of an external device which performs at, least one function of a data input/output function and a charging function, a socket unit 670 provided in the mobile communications terminal 600 to thus be connected to the connector 681 of the adapter 680, a switching unit 660 for forwarding data inputted from the external device connected to the socket unit 670 to designated paths according to at least one identification signal, a controller 640 for generating at least one control signal to control the forwarded data, and a memory 630 for storing the information namely, pin mapping allocation tables for the socket unit 670 and the connector 690 of the external device connected to the socket unit 670.

Here, the adapter 680 may include a first interface 681 connected to the socket unit 670 provided in the mobile communications terminal 600 and having pins arranged in a first direction, a second interface 683 connected to the first interface 681 and having pins arranged in a second direction, and a connection cable 682 for connecting the first interface 681 and the second interface 683. The connection cable 682 is flexible member. Here, preferably, the first direction denotes a horizontal or perpendicular direction with respect to the socket unit 670 provided in the mobile communications terminal 600, and the second direction cross at right angle with the first direction.

For example, regarding the adapter 680, in order to connect the connector 690 of the external device having 24 pins to the socket unit 670, the first interface 681 of the adapter 680 which is connected to the socket unit 670 can include 12 pins and the second interface 683 of the adapter 680 which connects the connector 690 of the external device can include 24 pins.

In accordance with present invention, a mobile communications terminal 600 using a multi-functional socket in accordance with a second embodiment of the present invention may include a second type of adapter 680A as shown in FIG. 6. The second type of adapter 680A can engaged with the connector 691 of a external device 690 and the socket unit 670. The second type of adapter 680A can match corresponding to the socket unit arranged at the other unusual location of the mobile communication terminal 600. For example, when the socket unit 670 is arranged at the side wall of the terminal, the adapter 680A can be connected with the socket unit 670 having the new arrangement because a first interface 681A of the adapter 680A can be arranged in the perpendicular direction to the longitudinal direction of the adapter 680A, i.e. directly facing the socket unit 670 arranged at the sidewall of the terminal, as shown in FIG. 6. Because a connection cable 682A and a second interface 683A of the second type of adapter 680A can be similarly constructed when compared to or substantially identical to the connection cable 682 and the second interface 683 of the adapter 680 as cited early, the detailed descriptions of the connection cable 682 and the second interface 683 may not be repeated. The scope of the present invention is not intended to be limited to any particular elements such as the external device or connector as described above. Moreover, the scope of the present invention may not be limited to any specific kind of external device or adapter, and other various interfaces can be considered to include the essential features of the present invention described in this.

Here, the construction of the mobile communications terminal using the multi-functional socket in accordance to the second embodiment of the present invention is the same as that of the mobile communications terminal using the multi-functional socket in accordance with the first embodiment of the present invention to accordingly omit a detailed explanation thereof. However, when the number of pins of the socket unit provided in the mobile communications terminal is not the same as the number of pins for the connector of the external device, how to use the adapter is different. Accordingly, pin mapping allocation tables for the adapter will now be explained with reference to FIGS. 7A through 7E.

FIGS. 7A through 7E are views illustrating pin allocation tables for a multi-functional socket in accordance with a second embodiment of the present invention.

As illustrated in FIG. 7A, it can be noticed in the second embodiment of the present invention that the mobile communications terminal 600 has been connected to an equipment for performing the data input/output function when an identification signal (i.e., EAR_SENSE(2)) is inputted from the socket unit 670 to which the external device is connected without using the adapter 680. Here, it can also be noticed that the data input/output function is being performed by third, fourth and fifth pins of the connector 690 of the external device. That is, EAR_M−(3) denotes an audio signal inputted through a microphone. EAR_L+(4) and EAR_R+(5) denote audio signals outputted from left and right sides of the earphone, respectively. In addition, a remote control function is being performed by sixth, ninth and tenth pins of the connector 690 of the external device. That is, REM_VCC(6) denotes a power of a remote controller, REM_INT(7) denotes such that the remote control is performed according to an interrupt method, and REM_ADC(8) denotes such that the remote control is performed according to an Analog Digital Converter (ADC) method.

Figure 7B:
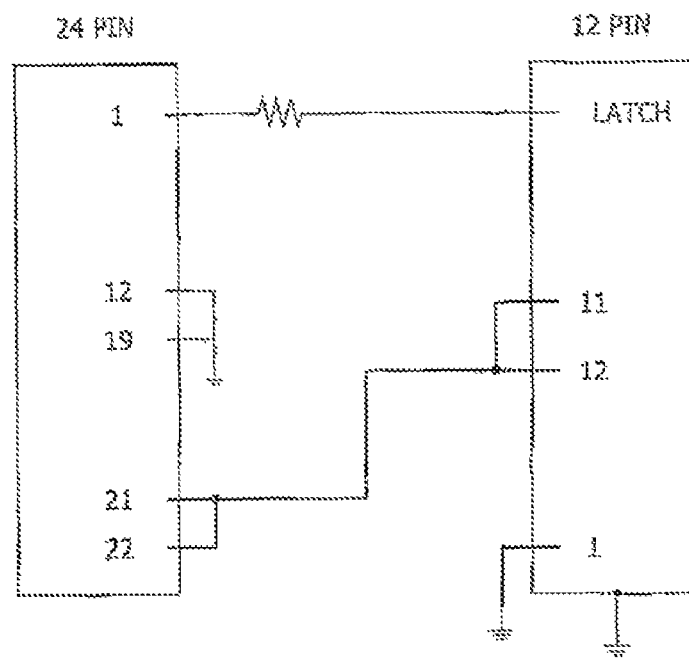

As illustrated in FIG. 7B, it can be noticed in the second embodiment of the present invention that the mobile communications terminal 600 has been connected to equipment for performing a charging function when an identification signal (i.e., BATTERY ID (LATCH)) is inputted from the socket unit 670 to which the external device is connected using the adapter 680. Here, it can be understood that the charging function is being performed by each VPWR 11 and 12 of the connector 690 of the external device.

Here, the LATCH pin denotes a pin for identifying a power signal inputted from the equipment for performing the charging function, and thus can be separately provided outside the first interface 681 of the adapter 680.

Figure 7C:
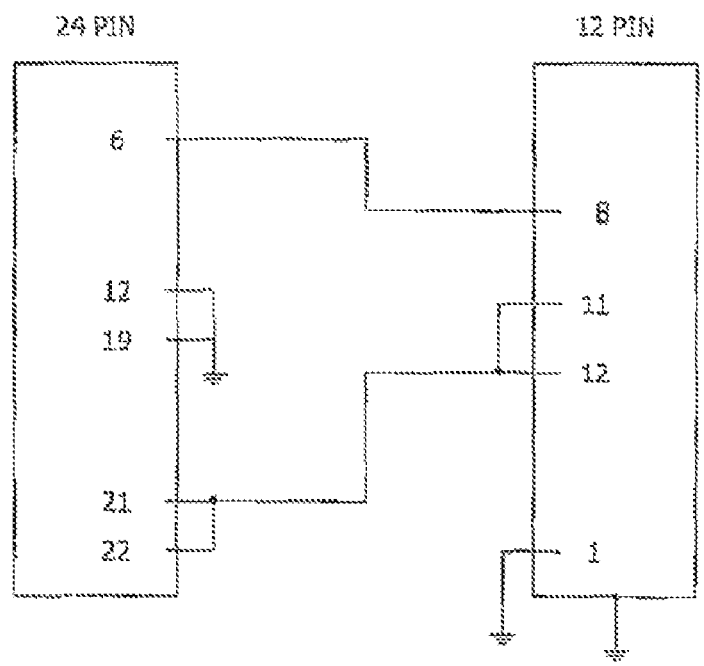

As illustrated in FIG. 7C, it can be noticed in the second embodiment of the present invention that the mobile communications terminal 600 has been connected to equipment, especially a developer equipment, for performing a data input/output function when an identification signal (i.e., ON_SWITCH(8)) is inputted from the socket unit 670 to which the external device is connected using the adapter 680. Here, it can be understood the connector 690 of the external device can recognize an insertion of a level converter through the ON_SWITCH(8). Equipment for a UART or USB data communication can be connected to the developer equipment for use in serial.

Figure 7D:
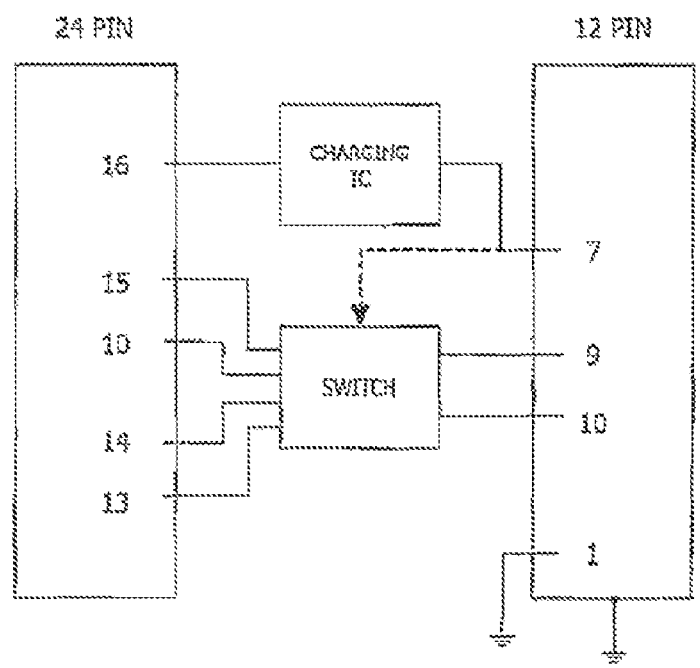

As illustrated in FIG. 7D, it can be noticed in the second embodiment of the present invention that the mobile communications terminal 600 has been connected to equipment for performing a data input/output function (i.e., a USB data communication) when an identification signal (i.e., USB_POWER(7)) is inputted from the socket unit 670 to which the external device is connected using the adapter 680. Here, in the connector 690 of the external device, USB_D+(9) and USB_D−(10) may be allocated for the USB data communication, the USB_POWER(7) denotes the identification signal or a battery charging through the USB, the USB_D+ denotes a sending of USB data, and the USB_D− denotes a receiving of the USB data. Because of allocating the same pin number for the USB communication or the UART communication, the adapter 680 may have a separate switch to redirect the USB or UART data to designated paths according to the identification signal (i.e., USB_POWER(7)).

Here, the adapter 680 may be provided with a separate charging Integrated Circuit (IC) for converting the USB power into a battery power of the mobile communications terminal 600 so as to enable a charging of the battery of the mobile communications terminal 600 using the USB power.

As illustrated in FIG. 7E, it can be noticed in the second embodiment of the present invention that the mobile communications terminal 600 has been connected to equipment for performing a data input/output function which is set to a default, namely, the UART data communication, when any identification signal is not inputted from an arbitrary pin of the socket unit 670 to which the external device 690 is connected using the adapter 680. Here, in the connector 690 of the external device, TXD(9) and RXD(10) may be allocated for the UART communication, wherein the TXD denotes a sending of the UART data and the RXD denotes a receiving of the UART data.

Thus, the mobile communications terminal 600 according to the second embodiment of the present invention generally provides the pin mapping allocation table for the equipment which is connected to the socket unit 670 and performs the data input/output function, and the pin mapping allocation table for the equipment which is connected to the second interface 682 of the adapter 680 and performs the data input/output function and the charging function by connecting the adapter 680 to the socket unit 670. Therefore, a principle for forwarding signals outputted from the socket unit 670 will now be explained with reference to FIG. 8.

Figure 8:
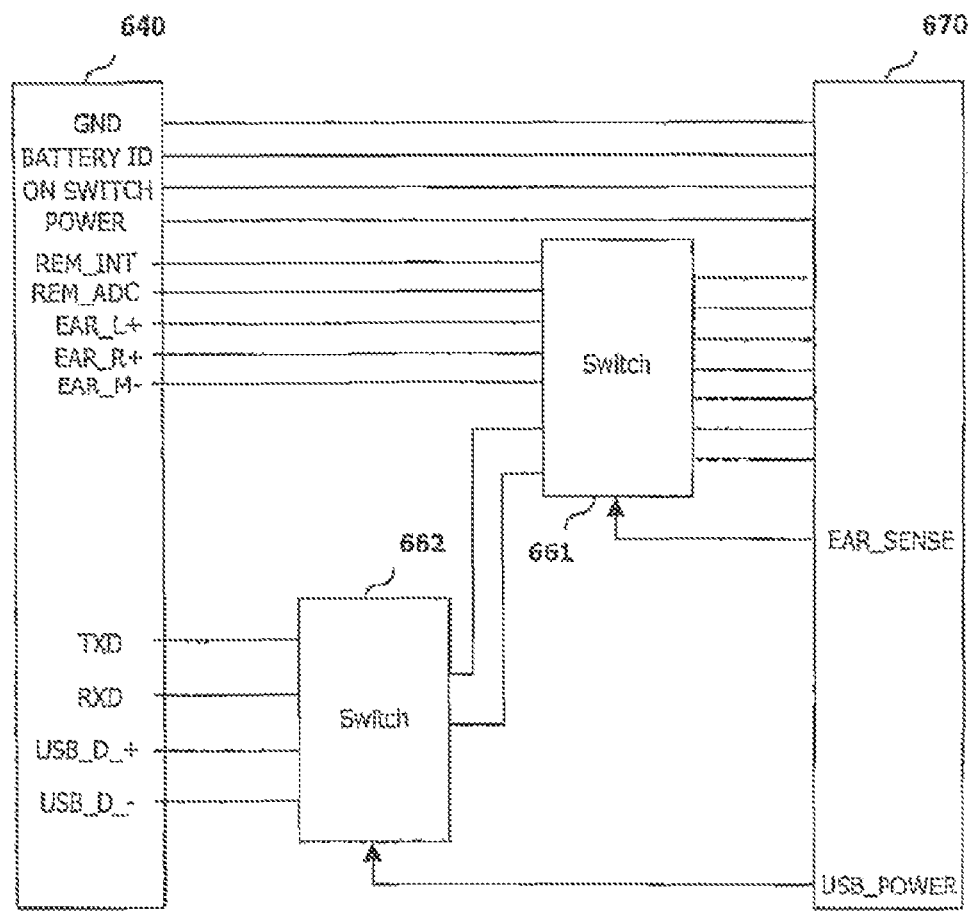
FIG. 8 is a view illustrating an operational principle of a switching processing unit in accordance with a second embodiment of the present invention.

FIG. 8 is a view illustrating an, operational principle of a switching unit in accordance with a second embodiment of the present invention.

As illustrated in FIG. 8, regarding the switching unit 660 in accordance with the second embodiment of the present invention, it can be noticed that a first switch 661 forwards data inputted from the socket unit 670 to paths corresponding to the equipment for performing the data input/output function based upon the EAR_SENSE signal, and then a second switch 662 forwards the data forwarded by the first switch 661 to paths corresponding to the UART and USB data communications based upon the USB_POWER signal.

Furthermore, when the number of pins of a connector 690 of the external device for performing at least one function of a data input/output function and a charging function is not constructed as same as the number of pins of the socket unit 670, an adapter 680 can connect the connector 690 of the external device with the socket unit 670. In addition, a first device to perform the data input/output function, and a second device to manage the charging function can simultaneously be connected to the adapter for further use. For the construction, the adapter 680 can comprise not only first and second interfaces 681, 682 but also a third connector having pins arranged in a first direction or second direction. Hence, a construction of a mobile communications terminal using a multi-functional socket in accordance with a third embodiment of the present invention will now be explained with reference to FIG. 9.

Figure 9:
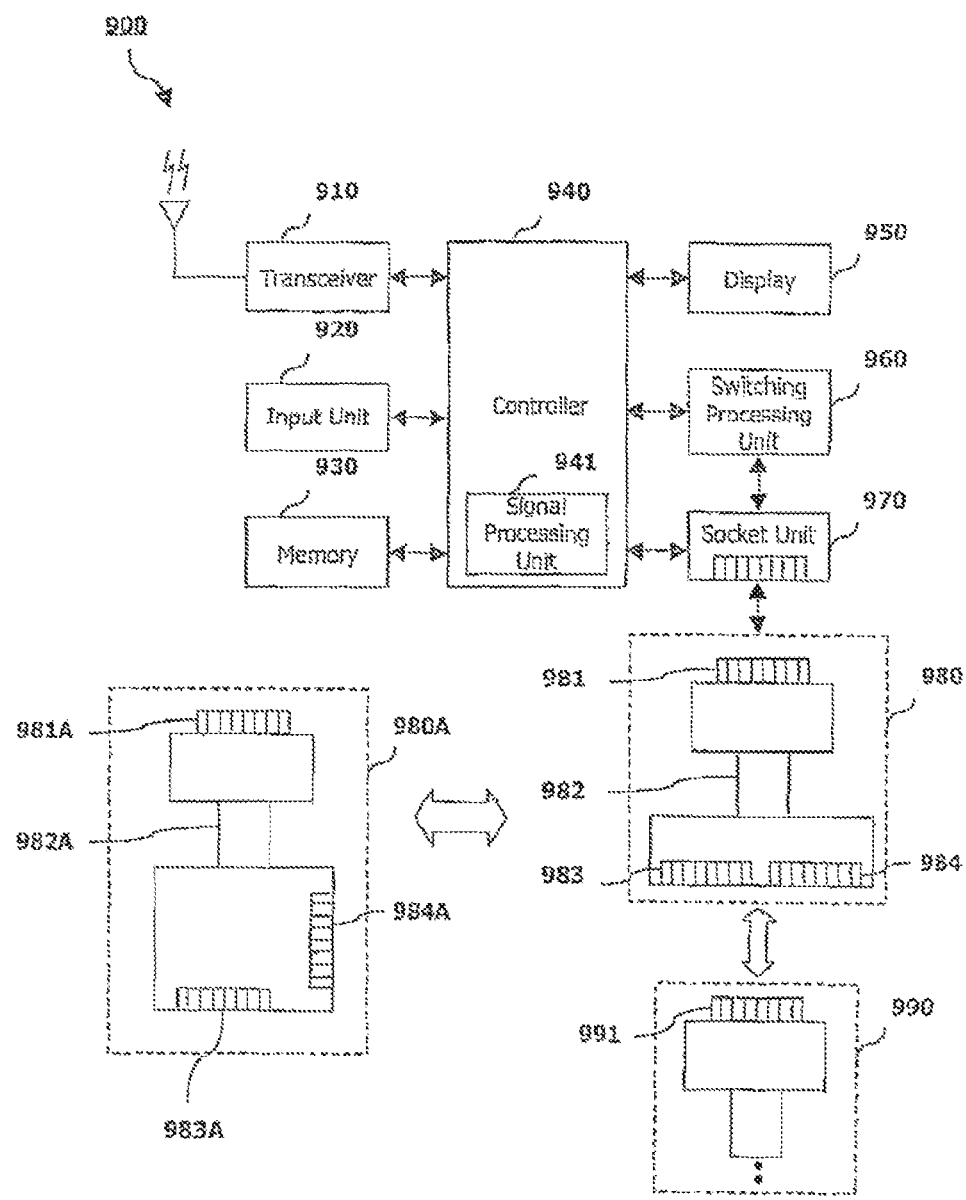
FIG. 9 is an exemplary view illustrating a construction of a mobile communications terminal using a multi-functional socket in accordance with a third embodiment of the present invention.

FIG. 9 is a view illustrating a construction of a mobile communications terminal using a multi-functional socket in accordance with a third embodiment of the present invention.

As illustrated in FIG. 9, a mobile communications terminal 900 using a multi-functional socket in accordance with a third embodiment of the present invention may include an adapter 980 connected to connector 990 of at least two external devices which perform at least one function of a data input/output function and a charging function. Here, the adapter 980 may include at least two female interfaces 983 and 984 respectively receiving a connector 990 of at least two external devices, and a male interface 981 connected to the socket unit 970.

Furthermore, the adapter 980 can have different arrangements of the female interfaces as shown in FIG. 9. For example, a different type of adapter 980A can include a first female interface 983A having a direction of orientation perpendicular to (or in any different angle) that of the second female interface 983B in accordance with the present invention. This arrangement can prevent two external devices from interfering with each other when connected to the adapter 980A.

Explanation for the mobile communications terminal using the multi-functional socket in accordance with the third embodiment of the present invention is the same as that in accordance with the second embodiment of the present invention, and thus a detailed explanation for the mobile communications terminal using the multi-functional socket in accordance with the third embodiment of the present invention will be omitted. Pin allocation tables of the extended socket unit in accordance with the third embodiment of the present invention will now be explained with reference to FIGS. 10A through 10F.

FIGS. 10A through 10F are views illustrating pin allocation tables for a multi-functional socket in accordance with a third embodiment of the present invention.

Figure 10B:
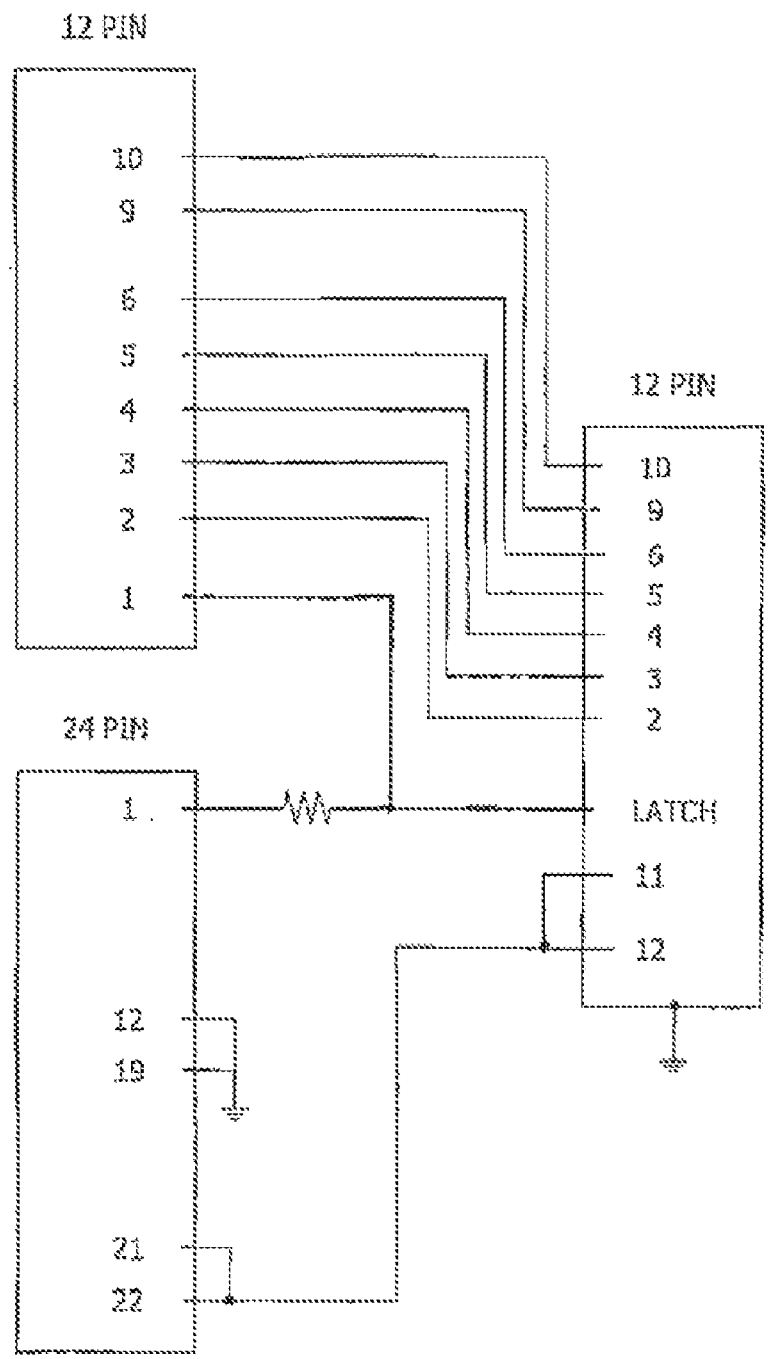

As illustrated in FIGS. 10A and 10B, it can be noticed in the third embodiment of the present invention that the mobile communications terminal 900 has been connected to both equipment for performing the data input/output function and equipment for performing the charging function when detecting identification signals (i.e., EAR_SENSE(2) and BATTERY ID (LATCH)) inputted from the socket unit 970 to which the at least two external device are connected. Here, in the connector of the external device which performs the data input/output function, the data input/output is performed by EAR_M−(3), EAR_L+(4) and EAR_R+(5), a remote control is performed by REM_VCC(6), REM_INT(9) and REM_ADC(10), and a charging function is performed by each VPWR (11,12) in the connector of the equipment which performs the charging function, all of which functions are simultaneously performed.

Here, the connector GND(1) of the equipment for performing the charging function, which is represented by a thick line, a connector GND(1) of the equipment for performing the data input/output function, and a interface BATTERY ID(LATCH) of the adapter 980 must all be opened. Accordingly, after connecting the equipment for performing the charging function to the adapter 980, when the adapter 980 is connected to the socket unit 970 of the mobile communications terminal 900, it may be possible to prevent an error of an unsuccessful charging which may occur due to non-recognition of a battery.

For example, the user connects both a charger and an earphone to the interfaces 983 and 984 of the adapter 980 to thus enable the charging for power of the mobile communications terminal 900 using the charger and the communicating with another party or listening to music using the earphone.

Figure 10D:
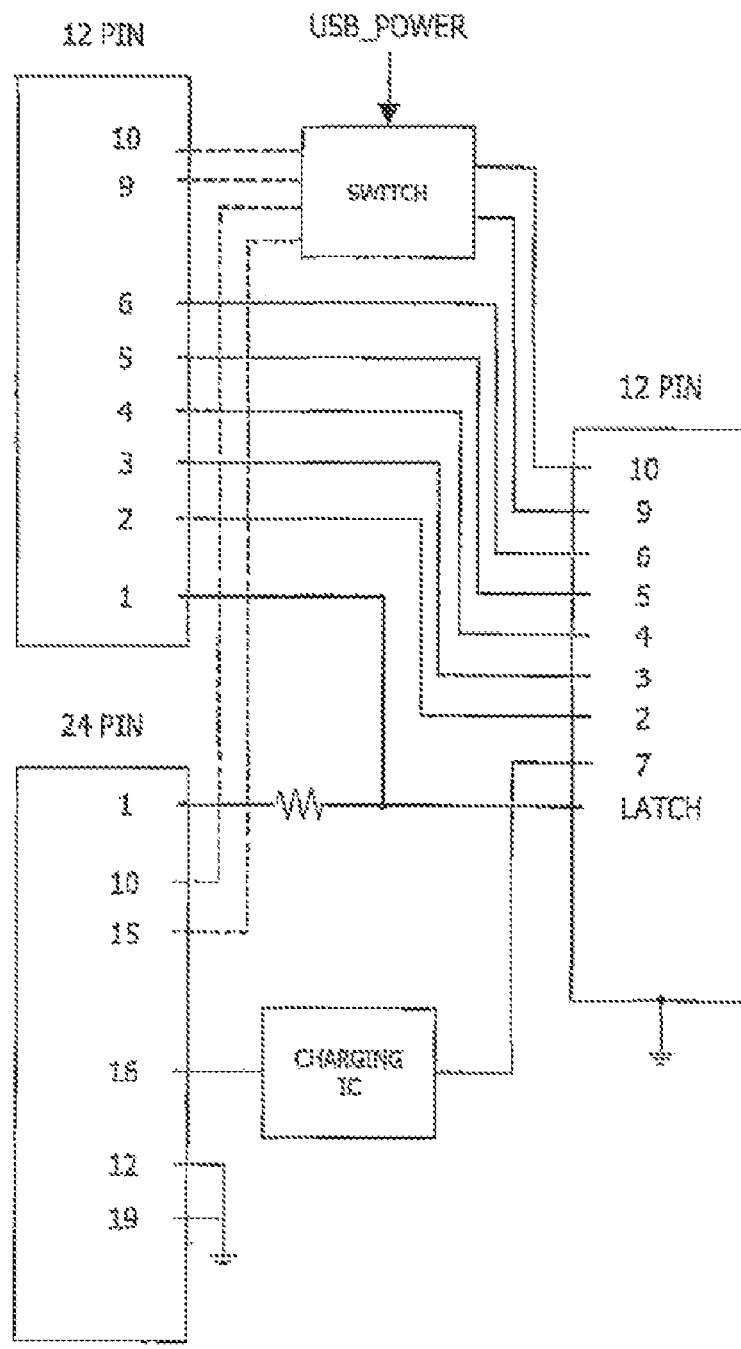

As illustrated in FIGS. 10C and 10D, it can be noticed in the third embodiment of the present invention that the mobile communications terminal 900 has been connected to the equipment for performing the charging function, and the equipment for performing the data input/output function when detecting identification signals (i.e., BATTERY ID (LATCH) and USB_POWER(7)) inputted from the socket unit 970 to which the several equipment are connected. Here, a data input/output is performed by EAR_M−(3), EAR_L+(4) and EAR_R+(5) in the connector of a first external device which performs the data input/output function, one of USB and UART data communication functions is performed by USB_D+/TXD(9) and USB_D−/RXD(10) in the connector of a second external device which performs the data input/output function, all of which functions are simultaneously performed. However, the ninth and tenth pins are equally allocated the remote control and one of the USB and UART data communications to thus be selected by a separate switch.

Figure 10F:
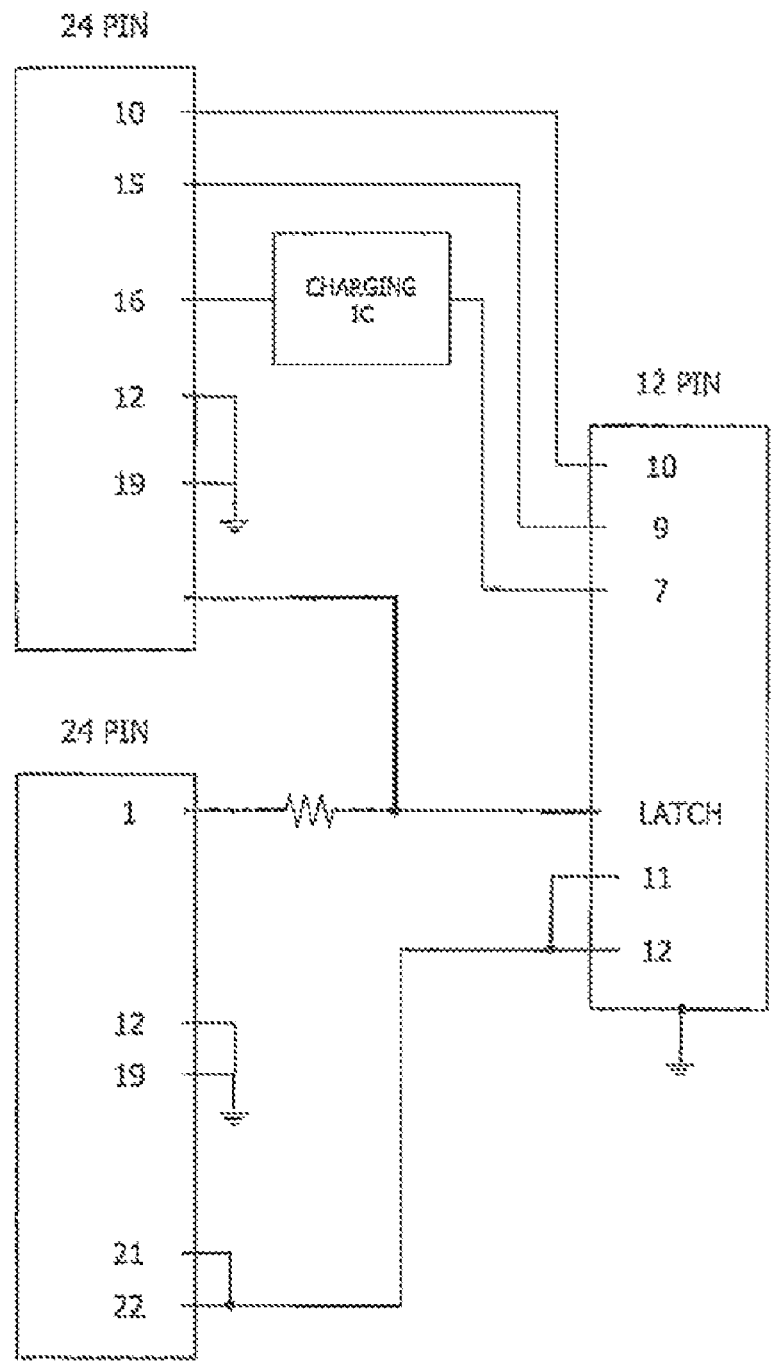

As illustrated in FIGS. 10E and 10F, it can be noticed in the third embodiment of the present invention that the mobile communications terminal 900 has been connected to the equipment for performing the charging function and the equipment for performing the data input/output function when detecting the identification signals (i.e., BATTERY ID (LATCH) and USB_POWER(7)) inputted from the socket unit 970 to which the several equipment are connected. Here, the charging function is performed by each VPWR(11, 12) in the connector of the external device which performs the charging function, and one of USB and UART data communications is performed by USB_D+/TXD(9) and USB_D−/RXD(10) in the connector of the external device which performs the data input/output function, all of which functions are simultaneously performed.

As described above, regarding the mobile communications terminal using the multi-functional socket according to the present invention and the method thereof, by implementing one socket unit for receiving at least one of the power signal and the data from the external device connected thereto, all of the data input/output function and the charging function can be performed by the one socket unit, so as to enable a minimization of the size of the mobile communications terminal.

In accordance with the present invention, a mobile communications device may comprise: a display unit; a connector capable of connecting the mobile communications device to at least one external device for establishing an electrical connection between the at least one external device and the mobile communications device; a switching unit; and a controller cooperating with the connector and the switching unit to perform, sending and/or receiving at least one signal with respect to the at least one external device via at least one dedicated path according to at least one identification signal; and generating a control signal to control the at least one signal, wherein the at least one signal comprises at least one of a power signal and data. The connector can comprise a plurality of first contacts, and wherein the at least one external device comprises an interface portion shaped in a configuration to include a plurality of second contacts and to connect the plurality of first contacts to the plurality of second contacts.

The device can include a memory device for storing contacts mapping allocation tables for at least one of the plurality of first and second contacts and storing an identity of the at least one external device. The switching unit may include: a first switch directing a portion of the data corresponding to the first external device performing the data input/output function via a first designated path based upon a first identification signal, and a second switch directing a portion of the data corresponding to the second external device performing the data input/output function via a second designated path based upon a second identification signal, wherein the data comprises at least one of a call connection signal, a call receiving signal, a general device controlling signal, a computer file, a text data, a Universal Serial. Bus (USB) data, and Universal Asynchronous Receiver/Transmitter (UART) data and a multimedia data.

The mobile communications device may further comprise a signal processing unit to process the directed data based upon the generated control signal, the signal processing unit comprising a plurality of functional modules for sending and receiving the data with respect to the at least one external device. The connector can be configured to connect the mobile communications device to the at least one external device for establishing an electrical connection between the at least one external device and the mobile communications device via an adapter having a first interface portion capable of being connected to the connector and a second interface portion capable of being connected to a connector portion of the at least one external device. In addition, the connector can be configured to connect the mobile communications device to two external devices for establishing an electrical connection between the two external devices and the mobile communications device respectively via an adapter having a first interface portion capable of being connected to the connector, a second interface portion capable of being connected to a connector portion of a first external device, and a third interface portion capable of being connected to a connector portion of a second external device. Here, the identification signal can comprise a signal from at least one pin of the connector to which a connector portion of the at least one external device is adapted to be connected in order to identify the at least one external device. The first interface portion can further include at least one pin for identifying a power signal inputted from the at least one external device capable of providing the power signal to the mobile communications device. The mobile communications device may comprise one of a mobile wireless phone, a Personal Digital Assistant (PDA), a notebook, and a Portable Multimedia Player (PMP).

In accordance with the present invention, a method for using a multi-functional connector of a mobile terminal may comprise: connecting at least one external equipment to the mobile terminal and establishing an electrical connection between the terminal and the equipment; determining whether to receive and send data between the at least one external equipment and the mobile terminal, or receive at the mobile terminal a power signal from an external equipment; processing the power signal if the mobile terminal is determined to receive the power signal; and directing the data to at least one designated path corresponding to at least one identification signal and generating at least one control signal to control directed data based upon the determining to receive and send the data. The method can further comprise: receiving the identification signal to identify the at least one external device, the identification signal comprising a signal from at least one pin of the connector to which a connector portion of the at least one external device is adapted to be connected.

The method may direct a portion of the data corresponding to a first external device performing the data input/output function via a first designated path according to a first identification signal; and direct a portion of the data corresponding to the second external device performing the data input/output function via a second designated path according to a second identification signal, wherein the data comprises at least one of a call connection signal, a call receiving signal, a general device controlling signal, a computer file, a text data, a Universal Serial Bus (USB) data, and Universal Asynchronous Receiver/Transmitter (UART) data and a multimedia data.

Additionally, the method can simultaneously process the power signal and direct the data to at least one designated path corresponding to at least one identification signal upon detecting the mobile terminal connected to a first external device for providing the power signal to mobile terminal and a second external device for performing the data input/output function. The method can comprise storing electrical contacts mapping allocation tables for at least one of a first external device for providing the power signal to mobile terminal, and a second external device for performing the data input/output function external; and storing an identity of at least one of the first and second external devices.

Furthermore, at least one of the plurality of electrical contacts can be adapted to be allocated for one of charging a battery of the mobile terminal, providing a power supplied via a USB, sending and receiving of USB data, sending and receiving UART data, sending and receiving a Clear To Send (CTS) signal, sending and receiving Ready To Send (RTS) signal, and indicating whether the at least one external device is connected to the mobile terminal.

As described above, there can an adapter for a mobile communications terminal, comprising: a main housing; a first aligning portion extending beyond a first surface of the main housing in a first direction; a plurality of first electrical contacts supported by the first aligning portion; and a plurality of second electrical contacts disposed along a second aligning portion spaced apart from the first aligning portion, the second aligning portion extending beneath a second surface of the main housing in a second direction. The first aligning portion may include an inner surface and an outer surface and the plurality of first electrical contacts are arranged at one of the inner surface and the outer surface.

The adapter can further comprise a plurality of third electrical contacts disposed along a third aligning portion spaced apart from the first aligning portion and the second aligning portion, wherein the third align portion are extending beneath of a third surface of the main housing in a third direction. At least one set of the plurality of the first, second and third electrical contacts can be adapted to mate with a connector of at least one electrical device. Here, the first, second and third direction can be one of parallel to one another and respectively different from one another. Furthermore, the adapter may include an indicator showing whether at least one of a mobile communications terminal and an external electrical device is connected to the adapter.

In accordance with the present invention, a system can comprise at least one external equipment comprising a connector portion; and a mobile communications terminal comprising, a connector capable of connecting the mobile communications terminal to the at least one external equipment; a switching unit; and a controller cooperating with the connector and the switching unit to perform, sending and/or receiving at least one signal with respect to the at least one external equipment via at least one dedicated path according to at least one identification signal; and generating a control signal to control the at least one signal, wherein the at least one signal comprises at least one of a power signal and data.

The system also can include an adapter comprising, a main housing; a first aligning portion extending beyond a first surface of the main housing in a first direction; a plurality of first electrical contacts supported by the first aligning portion; and a plurality of second electrical contacts disposed along a second aligning portion spaced apart from the first aligning portion, the second aligning portion extending beneath a second surface of the main housing in a second direction, wherein at least one set of the plurality of the first and second electrical contacts is adapted to mate with one of the connector portion of the at least one external equipment and the connector of the mobile communications terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication device, comprising:
a connector comprising a plurality of contacts and configured for connecting to at least one external device and establishing an electrical connection between the at least one external device and the mobile communication device;
a switching device configured for switching an allocation of at least one contact of the plurality of contacts;
a controller configured for cooperating with the connector and the switching device to:
send or receive at least one signal corresponding to the at least one external device via at least one dedicated path based on at least one identification signal related to the at least one external device; and
generate a control signal to control the sending or receiving of the at least one signal; and
a memory configured for storing at least one contact mapping table for the plurality of contacts, each of the at least one contact mapping table defining an allocation of the at least one signal to the plurality of contacts based on the at least one identification signal, the allocation of the at least one signal to the plurality of contacts changing the function of at least one contact of the plurality of contacts,
wherein each of the at least one contact mapping table is different from other of the at least one contact mapping table and is configured based on at least one corresponding external device of the at least one external device, and
wherein the at least one signal comprises at least a power signal or a data signal.

2. The mobile communication device of claim 1, wherein the plurality of contacts of the connector are configured for mating with a plurality of contacts of the at least one external device.

3. The mobile communication device of claim 1, wherein:
the at least one external device comprises a first external device and a second external device; and
the switching device comprises:
a first switch configured for directing a portion of data corresponding to the first external device via a first designated path of the at least one dedicated path based on a first identification signal of the at least one identification signal; and
a second switch configured for directing a portion of data corresponding to the second external device via a second designated path of the at least one dedicated path based on a second identification signal of the at least one identification signal,
wherein the data corresponding to the first external device and the second external device comprises at least a call connection signal, a call receiving signal, a general device controlling signal, a computer file, text data, Universal Serial Bus (USB data, Universal Asynchronous Receiver/Transmitter (UART) data or multimedia data.

4. The mobile communication device of claim 3, further comprising:
a signal processing unit configured for processing the directed portion of data corresponding to one of the first external device and the second external device based on the generated control signal, the signal processing unit comprising a plurality of functional modules configured for sending and receiving the portion of data corresponding to the first external device and the second external device.

5. The mobile communication device of claim 1, wherein the connector is further configured for connecting the mobile communication device to the at least one external device to establish communication via an adapter having a first interface portion configured to connect to the connector and a second interface portion configured to connect to a connector portion of the at least one external device.

6. The mobile communication device of claim 1, wherein the connector is further configured for connecting the mobile communication device to two external devices of the at least one external device to establish the electrical connection between the two external devices and the mobile communication device via an adapter having a first interface portion configured to connect to the connector, a second interface portion configured to connect to a connector portion of a first external device of the two external devices, and a third interface portion configured to connect to a connector portion of a second external device of the two external devices.

7. The mobile communication device of claim 6, wherein the first interface portion comprises at least one contact for identifying a power signal received from the at least one external device.

8. The mobile communication device of claim 1, wherein the at least one identification signal comprises a signal received via at least one contact of the plurality of contacts of the connector to which a connector portion of the at least one external device is configured to be connected for identifying the at least one external device.

9. The mobile communication device of claim 1, wherein the mobile communication device comprises a mobile wireless phone, a Personal Digital Assistant (PDA), a notebook, or a Portable Multimedia Player (PMP).

10. A method for using a multi-functional connector of a mobile terminal, the method comprising:
storing at least one contact mapping table in a memory of the mobile terminal, each of the at least one contact mapping table defining an allocation of at least one signal that corresponds to at least one external device to a plurality of contacts of a connector of the mobile terminal based on at least one identification signal related to the at least one external device, wherein each of the at least one contact mapping table is different from other of the at least one contact mapping table and is configured based on at least one corresponding external device of the at least one external device;
connecting the at least one external device to the mobile terminal via the connector;
establishing an electrical connection between the at least one external device and the mobile terminal via the connector;
determining, via a controller of the mobile terminal, whether to receive or send data between the at least one external device and the mobile or terminal or to receive, at the mobile terminal, a power signal from the at least one external device;
processing the power signal, via the controller, when a result of the determination is to receive the power signal; and
directing the data, via the controller, to at least one designated path corresponding to the at least one identification signal when a result of the determination is to receive or send the data, and
generating at least one control signal, via the controller, to control the directed data when a result of the determination is to receive and send the data,
wherein directing the data to the at least one designated path comprises:
directing, via a switching device of the mobile terminal, a portion of the data corresponding to a first external device of the at least one external device via a first designated path of the at least one dedicated path based on a first identification signal of the at least one identification signal; and
directing, via the switching device, a portion of the data corresponding to a second external device of the at least one external device via a second designated path of the at least one dedicated path based on a second identification signal of the at least one identification signal, and
wherein the allocation of the at least one signal to the plurality of contacts changes the function of at least one contact of the plurality of contacts.

11. The method of claim 10, further comprising:
receiving, via at least one contact of the plurality of contacts of the connector, the at least one identification signal to identify the at least one external device, the at least one identification signal comprising a signal received via the at least one contact of the plurality of contacts to which a connector portion of the at least one external device is configured to be connected.

12. The method of claim 10, further comprising:
directing, via a first switch of the switching device, the portion of data corresponding to the first external device via the first designated path of the at least one dedicated path based on the first identification signal; and
directing, via a second switch of the switching device, the portion of data corresponding to the second external device via the second designated path of the at least one dedicated path based on the second identification signal,
wherein the data corresponding to the first external device and the second external device comprises at least a call connection signal, a call receiving signal, a general device controlling signal, a computer file, a text data, Universal Serial Bus (USB) data, Universal Asynchronous Receiver/Transmitter (UART) data or multimedia data.

13. The method of claim 10, further comprising:
detecting, via the controller, that the mobile terminal is connected to the first external device and the second external device, the first external device configured for providing the power signal to mobile terminal and the second external device configured for performing data input and output; and
simultaneously processing the power signal and directing the data to the at least one designated path corresponding to the at least one identification signal upon the detection that the mobile terminal is connected to the first external device and the second external device.

14. The method claim 11, wherein connecting the at least one external device to the mobile terminal comprises mating the plurality of contacts of the connector with a plurality of contacts of a connector portion of the at least one external device.

15. The method of claim 10, further comprising allocating at least one contract of the plurality of contacts for one of for at least charging a battery of the mobile terminal, providing power supplied via a Universal Serial Bus (USB), sending and receiving USB data, sending and receiving Universal Asynchronous Receiver/Transmitter (UART) data, sending and receiving a Clear To Send (CTS) signal, sending and receiving a Ready To Send (RTS) signal, or indicating whether the at least one external device is connected to the mobile terminal.

* * * * *